US009625172B2

(12) United States Patent
Sasaki

(10) Patent No.: US 9,625,172 B2
(45) Date of Patent: Apr. 18, 2017

(54) MOTOR CONTROL DEVICE AND MOTOR CONTROL METHOD

(71) Applicant: Panasonic Intellectual Property Management Co., Ltd., Osaka-shi, Osaka (JP)

(72) Inventor: Ryuta Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 254 days.

(21) Appl. No.: 14/423,937

(22) PCT Filed: Apr. 26, 2013

(86) PCT No.: PCT/JP2013/002856
§ 371 (c)(1),
(2) Date: Feb. 25, 2015

(87) PCT Pub. No.: WO2014/041720
PCT Pub. Date: Mar. 20, 2014

(65) Prior Publication Data
US 2015/0211759 A1    Jul. 30, 2015

(30) Foreign Application Priority Data

Sep. 13, 2012    (JP) ................. 2012-201397

(51) Int. Cl.
*G05B 15/02* (2006.01)
*F24F 11/00* (2006.01)
(Continued)

(52) U.S. Cl.
CPC ............ *F24F 11/006* (2013.01); *F04D 27/00* (2013.01); *G05B 15/02* (2013.01); *H02P 6/28* (2016.02);
(Continued)

(58) Field of Classification Search
CPC ........................................................ G05B 15/02
(Continued)

(56) References Cited

U.S. PATENT DOCUMENTS 7,084,598 B2 *  8/2006  Yoshida ............... B60H 1/3222
                                                  318/400.11
2010/0101265 A1  4/2010  Yokouchi et al.
2013/0123604 A1  5/2013  Oyama

FOREIGN PATENT DOCUMENTS

EP    1 990 584 A2   11/2008
JP    6-235514 A      8/1994
(Continued)

OTHER PUBLICATIONS

Office Action and English language translation of Search Report in corresponding Chinese Application Serial No. 201380041250.3, dated Aug. 15, 2016, 7 pages.
(Continued)

*Primary Examiner* — David S Luo
(74) *Attorney, Agent, or Firm* — Brinks Gilson & Lione

(57) ABSTRACT

A motor control device according to the present invention is a device for controlling a motor driving an air blower. The motor control device includes: an air flow rate calculator configured to calculate an air flow rate supplied by the air blower; and a torque command generator configured to multiply a motor torque by a square of a ratio of a target air flow rate to the air flow rate or multiply a previously outputted torque command by the square of the ratio of the target air flow rate to the air flow rate, and generate a result of the multiplication as a torque command.

8 Claims, 5 Drawing Sheets

(51) Int. Cl.
*F04D 27/00* (2006.01)
*H02P 6/28* (2016.01)

(52) U.S. Cl.
CPC ......... *F24F 11/0079* (2013.01); *Y02B 30/746* (2013.01)

(58) Field of Classification Search
USPC ............................................. 318/3, 34, 558
See application file for complete search history.

(56) References Cited

FOREIGN PATENT DOCUMENTS

| | | |
|---|---|---|
| JP | 2002-112598 A | 4/2002 |
| JP | 2003-143887 A | 5/2003 |
| JP | 3738685 B2 | 1/2006 |
| JP | 2009-261080 A | 11/2009 |
| JP | 2012-029715 A | 2/2012 |
| JP | 2012-50285 A | 3/2012 |
| WO | WO 2008/117515 A1 | 10/2008 |

OTHER PUBLICATIONS

International Search Report, and English language translation thereof, in corresponding International Application No. PCT/JP2013/002856, dated Jul. 16, 2013, 5 pages.

\* cited by examiner

ND MOTOR
MOTOR CONTROL DEVICE AND MOTOR CONTROL METHOD

This application is a 371 application of PCT/JP2013/002856 having an international filing date of Apr. 26, 2013, which claims priority to JP 2012-201397 filed Sep. 13, 2012, the entire contents of which are incorporated herein by reference.

TECHNICAL FIELD

The present invention relates to a motor control device and a motor control method. The present invention particularly relates to a method of controlling the air flow rate of an air blower in an air-conditioning system performing ventilation, cooling, and heating.

BACKGROUND ART

In an air-conditioning system performing ventilation, cooling, and heating, conditions that determine pressure loss of the air-conditioning system (hereinafter, "pressure loss conditions") vary in accordance with the installation state, usage state, etc., of an air conditioner including an air blower. For example, the pressure loss conditions vary in accordance with differences in the shape and length of a duct connected to the air conditioner. In addition, clogging of filters fitted to a discharge port and a suction port of the air conditioner causes temporal changes in the pressure loss conditions. A static pressure necessary for obtaining a predetermined air flow rate also varies in accordance with the variation and temporal changes in the pressure loss conditions. For these reasons, even if a plurality of air conditioners of the same specifications are driven at the same torque or same rotation speed, air flow rates obtained from the respective air conditioners may vary, or there may be a case where even if one air conditioner is driven at a constant torque or constant rotation speed, the air flow rate of the air conditioner cannot be kept to a constant air flow rate. Therefore, in recent years, it is required to perform control to keep the air flow rate to a target air flow rate regardless of changes occurring in the pressure loss conditions and static pressure. (Hereinafter, such control is referred to as "constant air flow rate control".)

As one example of a technique for realizing the constant air flow rate control, there is a technique using a pressure sensor. However, the technique using a pressure sensor has problems in terms of ease of installation and reliability under long-term use. Therefore, various techniques using no pressure sensor but utilizing characteristics inherent to an air blower (hereinafter, "blower characteristics"), the characteristics being necessary for the constant air flow rate control, have been studied. Such a technique requires, prior to starting an operation based on the constant air flow rate control, a measurement experiment to be conducted for measuring a relationship between physical quantities of the motor of the air blower (e.g., motor speed, motor torque, etc.) and the air flow rate of the air blower. Then, the constant air flow rate control is performed by utilizing blower characteristics obtained from the measurement experiment.

One of such known constant air flow rate control techniques is, for example, a technique disclosed by Patent Literature 1. In the conventional technique disclosed by Patent Literature 1, a designated speed of a motor driving an air blower is calculated from an equation (1) below. [Math. 1]

$$S^* = S + K \times (S - Sa) \quad (1)$$

In the equation (1), $S^*$ is a designated motor speed; $S$ is a motor speed; $Sa$ is a target motor speed; and $K$ is a gain. The target motor speed $Sa$ is calculated from an equation (2) below.

[Math. 2]

$$Sa = \sum_{n=0}^{j}\left(\sum_{m=0}^{i}(k_{nm}T^n Q^{*m})\right) \quad (2)$$

In the equation (2), $T$ is a motor torque; $Q^*$ is a target air flow rate; $k_{nm}$ ($n=0, 1, 2, \ldots, j$ and $m=0, 1, 2, \ldots, i$) is a constant; and $i$ and $j$ are finite values. The equation (2) represents the following relationship: in a case where the motor torque is $T$, a motor speed necessary for the air flow rate to become the target air flow rate $Q^*$ is $Sa$.

Hereinafter, constant air flow rate control using a motor control device disclosed in Patent Literature 1 is described with reference to FIG. 6. FIG. 6 illustrates the conventional constant air flow rate control technique using the motor control device.

In FIG. 6, a curve 601 represents torque-speed characteristics that allow the air flow rate to become the target air flow rate $Q^*$ (hereinafter, the curve 601 is referred to as a "constant air flow rate curve"); and a curve 602 represents motor torque-speed characteristics specific to pressure loss conditions under which the motor is installed (hereinafter, the curve 602 is referred to as a "pressure loss curve"). Assume here that the operating point of the motor is currently a point A1 on the pressure loss curve 602. At the time, the target motor speed $Sa$ calculated by using the equation (2) is a motor speed $Sa1$ at a point B1 on the constant air flow rate curve 601, at which a motor torque $T1$ is obtained, which is the same torque as that obtained at the current operating point A1. Then, based on the equation (1), the motor speed $Sa1$ is subtracted from the motor speed $S1$ at the current operating point A1, and the resultant difference (represented by $\Delta S$ in FIG. 6) is multiplied by the gain $K$ and added to the motor speed $S1$. The value resulting from the calculation is outputted as the designated motor speed $S^*$ (not shown). Then, the motor speed is controlled in accordance with the designated speed $S^*$, and thereby the operating point moves.

After the operating point has moved, the designated speed $S^*$ is newly calculated by using the equation (2) and the equation (1) in the same manner. As a result of repeating the calculations using these equations, the operating point moves to A2 and A3 as shown in FIG. 6, and eventually reaches an operating point at which the difference between the motor speed $S$ and the target motor speed $Sa$ is zero, i.e., reaches an intersection point E of the pressure loss curve 602 and the constant air flow rate curve 601.

The motor control device disclosed in Patent Literature 1 calculates a necessary correction value to the motor speed by using a motor torque and a target air flow rate in the above-described manner, and outputs a designated speed based on the correction value, thereby making it possible to perform constant air flow rate control that is not affected by changes in the pressure loss conditions and static pressure.

CITATION LIST

Patent Literature

PTL 1: (PCT) International Publication No. WO 2008/117515

SUMMARY OF INVENTION

Technical Problem

In the conventional technique disclosed by Patent Literature 1, the manner in which the motor speed changes and then converges varies in accordance with the value of the gain K in the equation (1). For example, in a case where the value of the gain K is small, a change in the designated speed S* relative to each calculation cycle is small. In this case, it takes time for the motor speed to converge. On the other hand, in a case where the value of the gain K is large, the change in the calculated designated speed S* is great. In this case, the motor speed repeatedly reaches and deviates from the convergence point E in FIG. 6, and the motor speed does not stably converge. In order to avoid these problems, experiments are conducted with different values of the gain K, and thereby an optimal value of the gain K is obtained.

However, the optimal value of the gain K changes in accordance with the pressure loss conditions in the air-conditioning system. The gain K that makes stable control possible under particular pressure loss conditions may be an excessive gain under other pressure loss conditions that have changed due to, for example, filter clogging or opening/closing of a vent cap. Such an excessive gain may hinder stable convergence of the operating point. Therefore, on the assumption that the applied pressure loss conditions may change, it is desired that the gain K be set to a sufficiently small value so that the air blower can operate stably even in an operating region in which unstable operation tends to be caused.

However, in a case where the value of the gain K is small, the convergence takes time. For this reason, when the target air flow rate is changed or the pressure loss conditions have changed, it takes a long time for the air flow rate to converge to the target air flow rate again.

The present invention has been made to solve the above-described conventional problems. An object of the present invention is to provide a motor control device capable of causing the air flow rate of an air blower to follow a target air flow rate at high speed and stably converge.

Solution to Problem

In order to achieve the aforementioned object, a motor control device according to one aspect of the present invention is a motor control device for controlling a motor driving an air blower, and includes: an air flow rate calculator configured to obtain a motor speed and a motor torque of the motor, and calculate an air flow rate of the air blower based on the motor speed and the motor torque of the motor; and a torque command generator configured to multiply the motor torque by a square of a ratio of a target air flow rate to the air flow rate or multiply a previously outputted torque command by the square of the ratio of the target air flow rate to the air flow rate, and generate a result of the multiplication as a torque command.

A motor control method according to another aspect of the present invention is a motor control method of controlling a motor driving an air blower. The method includes: obtaining a motor speed and a motor torque of the motor; calculating an air flow rate of the air blower based on the obtained motor speed and motor torque; and multiplying the motor torque by a square of a ratio of a target air flow rate to the air flow rate or multiplying a previously outputted torque command by the square of the ratio of the target air flow rate to the air flow rate, and generating a torque command by utilizing a result of the multiplication.

Advantageous Effects of Invention

According to the motor control device and the motor control method of the present invention, by controlling the motor in accordance with the torque command, which is equal to a motor torque at which the target air flow rate is attained, the air flow rate can be caused to follow the target air flow rate at high speed and stably converge.

DETAILED DESCRIPTION OF THE PREFERRED EMBODIMENTS

Figure 1:
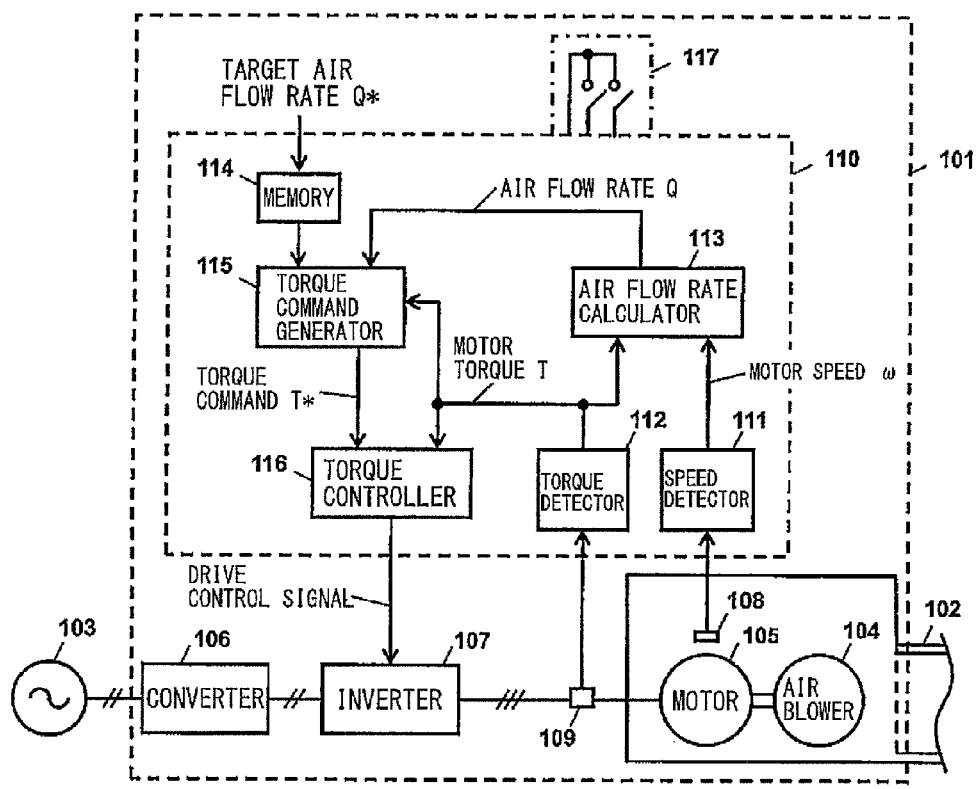
FIG. 1 is a block diagram showing an example of the configuration of a motor control system including a motor control device according to Embodiment 1 of the present invention.

Point on which Present Invention is Focused

Aiming to cause the air flow rate of an air blower to follow a target air flow rate at high speed and stably converge, the inventors of the present invention focused their attention on the fact that, generally speaking, for an air blower such as a fan or a blower, the following scientific laws are derived from similarity of flows in fluid dynamics: a law that the air flow rate of the air blower is proportional to its rotation speed under fixed pressure loss conditions; and a law that the shaft torque of the air blower is proportional to the square of its rotation speed. It should be noted that these laws hold true also for general fluid machinery other than air blowers. If there is no axial run-out between the air blower and a motor or if the air blower and the motor are connected such that their axes coincide with each other, it can be assumed that the rotation speed of the air blower is equal to the motor speed, and that the shaft torque of the air blower is equal to the motor torque. Accordingly, the above two laws derived from the similarity of flows can be deemed to be a law that the air flow rate is proportional to the motor speed and a law that the motor torque is proportional to the square of the motor speed. Based on these deemed laws, the following relationship holds true: the square of the ratio of a target air flow rate to an air flow rate is equal to the ratio of a motor torque realizing the air flow rate value of the target air flow rate to a motor torque. Therefore, a motor torque is multiplied by the square of the ratio of a target air flow rate to an air flow rate, and the resultant value (i.e., the product of the square of the ratio of the target air flow rate to the air flow rate and the motor torque) is set as a torque command. Accordingly, even if the target air flow rate has significantly changed due to changes in pressure loss conditions, the torque command promptly changes to a motor torque value that realizes the new target air flow rate. This makes it possible to cause the air flow rate to follow the target air flow rate at high speed.

Since torque control of the motor is performed, the torque command and the motor torque are substantially equal except during a steep transient period. Therefore, a previously outputted torque command may be multiplied by the square of the ratio of the target air flow rate to the air flow rate, and the resultant value (i.e., the product of the square of the ratio of the target air flow rate to the air flow rate and the previously outputted torque command) may be set as a torque command.

Specifically, a motor control device according to a first aspect of the present invention is a motor control device for controlling a motor driving an air blower. The motor control device includes: an air flow rate calculator configured to obtain a motor speed and a motor torque of the motor, and calculate an air flow rate of the air blower based on the motor speed and the motor torque; and a torque command generator configured to multiply the motor torque by a square of a ratio of a target air flow rate to the air flow rate or multiply a previously outputted torque command by the square of the ratio of the target air flow rate to the air flow rate, and generate a result of the multiplication as a torque command.

According to the above configuration, the torque command generator can generate a torque command that is equal to a motor torque at which the target air flow rate is attained.

A second aspect of the present invention is such that, in the first aspect, the motor control device further includes a torque controller configured to generate a signal that controls a drive voltage to the motor such that the motor torque becomes coincident with the torque command.

A third aspect of the present invention is such that, in the first aspect, the motor control device includes a storage unit configured to store a minimum torque and a maximum torque. The torque command generator limits the torque command to be in a range from the minimum torque to the maximum torque.

A fourth aspect of the present invention is such that, in the first aspect, if a difference between the torque command and the motor torque is out of a first predetermined range, the torque command generator corrects the torque command such that the difference between the torque command and the motor torque becomes within the first predetermined range.

A fifth aspect of the present invention is such that, in the first aspect, in at least one of a case where a difference between the torque command and the motor torque is in a second predetermined range and a case where a difference between the currently obtained motor torque and a previously obtained motor torque is in the second predetermined range, the torque command generator outputs the torque command whose value is the same as that of the previously outputted torque command.

A sixth aspect of the present invention is such that, in the first aspect, the air flow rate calculator obtains the motor speed by receiving a first detection signal indicative of the motor speed, which is inputted from a first detector configured to detect the motor speed.

A seventh aspect of the present invention is such that, in the first aspect, the air flow rate calculator obtains the motor torque by receiving the motor torque or a current flowing through the motor, each of which is inputted from a second detector configured to detect the motor torque or the current flowing through the motor.

An eighth aspect of the present invention is a motor control method of controlling a motor driving an air blower. The method includes: obtaining a motor speed and a motor torque of the motor; calculating an air flow rate of the air blower based on the obtained motor speed and motor torque; and multiplying the motor torque by a square of a ratio of a target air flow rate to the air flow rate or multiplying a previously outputted torque command by the square of the ratio of the target air flow rate to the air flow rate, and generating a torque command by utilizing a result of the multiplication.

Hereinafter, embodiments of the present invention are described with reference to the drawings. It should be noted that the present invention is not limited by the embodiments described below.

Embodiment 1

FIG. 1 is a block diagram showing an example of the configuration of a motor control system including a motor control device according to Embodiment 1 of the present invention. The motor control system in FIG. 1 includes: an air conditioner 101; an air supply passage 102 through which air supplied from the air conditioner 101 flows; an AC power supply 103; an air blower 104; a motor 105 driving the air blower 104; a converter 106 configured to convert AC power from the AC power supply 103 into DC power; an inverter 107 configured to convert the DC power into AC power and supply the AC power to the motor 105; a position detector 108 configured to detect the position of the rotor (not shown) of the motor 105; a current detector 109 configured to detect the current of the motor 105; and a motor control device 110 configured to control the air flow rate of the air conditioner 101 to be a target air flow rate $Q^*$.

The air conditioner 101 includes: a speed detector 111 configured to detect a motor speed w based on an output signal from the position detector 108; a torque detector 112 configured to detect a motor torque T based on an output signal from the current detector 109; an air flow rate calculator 113 configured to calculate an air flow rate Q supplied by the air blower 104; a memory 114 configured to store the target air flow rate $Q^*$, which is inputted from the outside; a torque command generator 115 configured to generate a torque command $T^*$ based on the air flow rate Q calculated by the air flow rate calculator 113 and the target air flow rate $Q^*$ retrieved from the memory 114; a torque controller 116 configured to output a drive control signal to the inverter for causing the motor torque T to follow the torque command $T^*$; and a switch 117. The speed detector 111 may detect the motor speed w by using other known means (e.g., a tachometer, speed sensor, or the like). Also, the torque detector 112 may detect the motor torque T by using other known means (e.g., a torque meter).

Next, operations to be performed and the components in FIG. 1 are described in detail. The air blower 104 supplies air to an intended position through the air supply passage 102. In the present embodiment, the air blower 104 is a multi-blade fan. However, the structure and type of the air blower 104 are not particularly limited. The air blower 104 need not be a multi-blade fan. The motor 105 rotates in a state of being connected to the air blower 104, thereby driving the air blower 104. In the present embodiment, the motor 105 is a permanent magnet synchronous motor. However, the structure and type of the motor 105 are not particularly limited. The motor 105 may be a different motor, such as an induction motor or electromagnet synchronous motor. The converter 106 rectifies and smoothes an AC voltage from the AC power supply 103, thereby converting the AC voltage into a predetermined DC voltage. The inverter 107 performs semiconductor switching in accordance with the drive control signal inputted from the motor control device 110, converts the DC voltage from the converter 106 into an AC voltage, and supplies the AC voltage to the motor 105 as a drive voltage. The switch configuration in the inverter 107 and the switching method to be adopted are not particularly limited, so long as they are suitable for the purpose of driving the motor 105. The position detector 108 is attached to the motor 105, and outputs a signal corresponding to the position of the rotor (not shown) of the motor 105. It should be noted that the position detector 108 is not necessary if the position and speed of the rotor can be detected by estimation. The current detector 109 directly detects a phase current of the motor, and outputs a signal corresponding to a phase current value. However, the current detector 109 may detect the current at any position, so long as a motor torque can be estimated from the detected current. For example, the current detector 109 may be inserted in the DC line from the converter 106 to the inverter 107, and may detect the current at the insertion position.

Hereinafter, operations and components of the motor control device 110 are described.

The speed detector 111 calculates the motor speed $\omega$ based on an output signal from the position detector 108. However, in a case where the motor 105 is driven by sensorless control in which the position and speed of the rotor are detected by estimation, the motor speed $\omega$ may be calculated by using a motor current and a motor-driving voltage instead of using an output signal from the position detector 108. The torque detector 112 calculates the motor torque T based on an output signal from the current detector 109. The motor torque T herein may be a physical quantity containing torque information about the motor 105, for example, a motor current or a vector component of the motor current, the vector component contributing to the torque. The vector component contributing to the torque may be, for example, a q-axis current obtained through d-q conversion of the motor current. The speed detector 111 and the torque detector 112 need not be included inside the motor control device 110 as shown in FIG. 1, but may be arranged outside the motor control device 110. However, in the case of arranging the speed detector 111 and the torque detector 112 outside the motor control device 110, the calculated motor speed $\omega$ or motor torque T is inputted to the motor control device 110.

The air flow rate calculator 113 calculates the air flow rate Q supplied by the air blower 104 based on the motor speed $\omega$ inputted from the speed detector 111 and the motor torque T inputted from the torque detector 112. In the present embodiment, the air flow rate Q is calculated by using an equation (3) below although the means for the calculation is not particularly limited.

[Math. 3]
$$Q = \sum_{n=0}^{i} \left[ \alpha_n \cdot \left( \frac{\omega}{\beta} \right)^{1-2n} \cdot T^n \right] \quad (3)$$

In the equation (3), $\omega$ is a motor speed; T is a motor torque; i is a finite value, which is an integer greater than or equal to 0; and $\alpha_n$ (n=0, 1, 2, ..., i) and $\beta$ are constants.

The equation (3) represents a relationship in which the air flow rate becomes Q relative to any motor speed $\omega$ and any motor torque T. This relationship is characterized by the coefficients $\alpha_n$ and $\beta$, and these coefficients have values inherent to the shape and dimensions of the air blower. Hereinafter, these coefficients $\alpha_n$ and $\beta$ are referred to as blower coefficients. Prior to starting an operation controlled by constant air flow rate control, the values of the blower coefficients $\alpha_n$ and $\beta$ are obtained by performing a measurement experiment.

Hereinafter, the measurement experiment and derivation of the equation (3) are described.

First, the air blower is driven at a constant motor speed $\omega_S$. While the air blower is being driven at the constant motor speed $\omega_S$, the static pressure in an environment where the air blower is installed is changed. Then, the relationship between an air flow rate $Q_S$ and a motor torque $T_S$ at the time is regressed to a polynomial equation (4) below.

[Math. 4]
$$Q_S = \sum_{n=0}^{i} (K_n \cdot T_S^n) \quad (4)$$

In the equation (4), i is a finite value, which is an integer greater than or equal to 0 and indicates the degree of the regression equation; and $K_n$ is a constant (n=0, 1, 2, ..., i), which indicates a coefficient in the regression equation.

Generally speaking, for an air blower such as a fan or a blower, the following scientific laws are derived from similarity of flows: a law that the air flow rate of the air blower is proportional to its rotation speed under fixed pressure loss conditions; and a law that the shaft torque of the air blower is proportional to the square of its rotation speed. These laws hold true also for general fluid machinery other than air blowers. If there is no axial run-out between the air blower and the motor or if the air blower and the motor are connected such that their axes coincide with each other, it can be assumed that the rotation speed of the air blower is equal to the motor speed, and that the shaft torque of the air blower is equal to the motor torque. Accordingly, the above two laws derived from the similarity of flows can be deemed to be a law that the air flow rate is proportional to the motor speed and a law that the motor torque is proportional to the square of the motor speed. Based on these deemed laws, equations (5) and (6) below hold true.

[Math. 5]
$$\frac{Q}{Q_S} = \frac{\omega}{\omega_S} \quad (5)$$

[Math. 6]

$$\frac{T}{T_S} = \left(\frac{\omega}{\omega_S}\right) \tag{6}$$

The above two equations represent the following relationship: when the motor speed of the motor driving the air blower changes from $\omega_S$ to $\omega$, the air flow rate changes from $Q_S$ to Q at the same rate as the change rate $(\omega/\omega_S)$ of the motor speed, and at the same time, the motor torque changes from $T_S$ to T at a rate that is the square of the change rate $(\omega/\omega_S)$ of the motor speed. By applying the equation (5) and the equation (6) to the equation (4), an equation (7) below is derived.

[Math. 7]

$$Q = \sum_{n=0}^{i} \left[ K_n \cdot \left(\frac{\omega}{\omega_S}\right)^{1-2n} \cdot T^n \right] \tag{7}$$

In the equation (7), Q is an air flow rate; w is a motor speed; T is a motor torque; i is a finite value, which is an integer greater than or equal to 0 and is the same as the degree of the equation (4); $K_n$ is a constant (n=0, 1, 2, ..., i), which is the same as the coefficient in the equation (4); and $\omega_S$ is a particular motor speed when the equation (4) is obtained.

The equation (3) is derived by replacing the constants $K_n$ and $\omega_S$ in the equation (7) with $\alpha_n$ and $\beta$, respectively. Based on the above, while the air blower is being driven at one motor speed $\omega_S$, the motor torque and the air flow rate are measured, and by regressing the measurement results to the equation (4), the values of the blower coefficients $\alpha_n$ and $\beta$ can be immediately determined from $K_n$ and $\omega_S$.

The grounds for the equation (3) used in the air flow rate calculation by the air flow rate calculator 113 and the measurement experiment for obtaining the blower coefficients $\alpha_n$ and $\beta$ are as described above.

The memory 114 is a storage unit constituted by a RAM, ROM, and the like. The target air flow rate Q* is stored in the ROM in advance. When the torque command generator 115 performs arithmetic operation described below, the target air flow rate Q* is retrieved from the ROM and utilized in the arithmetic operation. A plurality of values of the target air flow rate Q* may be stored in the ROM. In this case, one of the plurality of values of the target air flow rate Q* is selected by a communication input from the outside of the motor control device 110. Alternatively, one of the plurality of values of the target air flow rate Q* may be selected by manually operating the switch 117 provided on the motor control device 110.

It is not essential for the target air flow rate Q* to be stored in the ROM in advance. The target air flow rate Q* may be transmitted to the motor control device 110 when necessary by a communication input from the outside of the motor control device 110. In this case, the target air flow rate Q* received by the motor control device 110 is stored in the RAM or the like in the memory 114, and the stored target air flow rate Q* is updated every time the target air flow rate Q* is newly transmitted to the motor control device 110.

The value of the target air flow rate Q* to be transmitted from the outside by a communication input is determined based on an air-conditioning environment in which the motor 105 is installed. Specifically, the target air flow rate Q* is determined based on, for example, how much air flow rate needs to be fed into a reference room among indoor rooms to be air-conditioned, or how much air flow rate feed is efficient for the air-conditioning equipment. The target air flow rate Q* may be corrected in accordance with the climate or the like in a region in which the air-conditioning equipment is installed. For example, in a warm and humid region, the target air flow rate Q* may be set to be relatively high. If the air-conditioning environment is known in advance, the target air flow rate Q* may be set before the installation of the motor. Of course, at the time of installing the motor, the air-conditioning environment may be checked and then the target air flow rate Q* may be set.

The torque command generator 115 generates the torque command T*, which specifies the torque of the motor 105, based on the air flow rate Q calculated by the air flow rate calculator 113 and the target air flow rate Q* retrieved from the memory 114.

Figure 2:
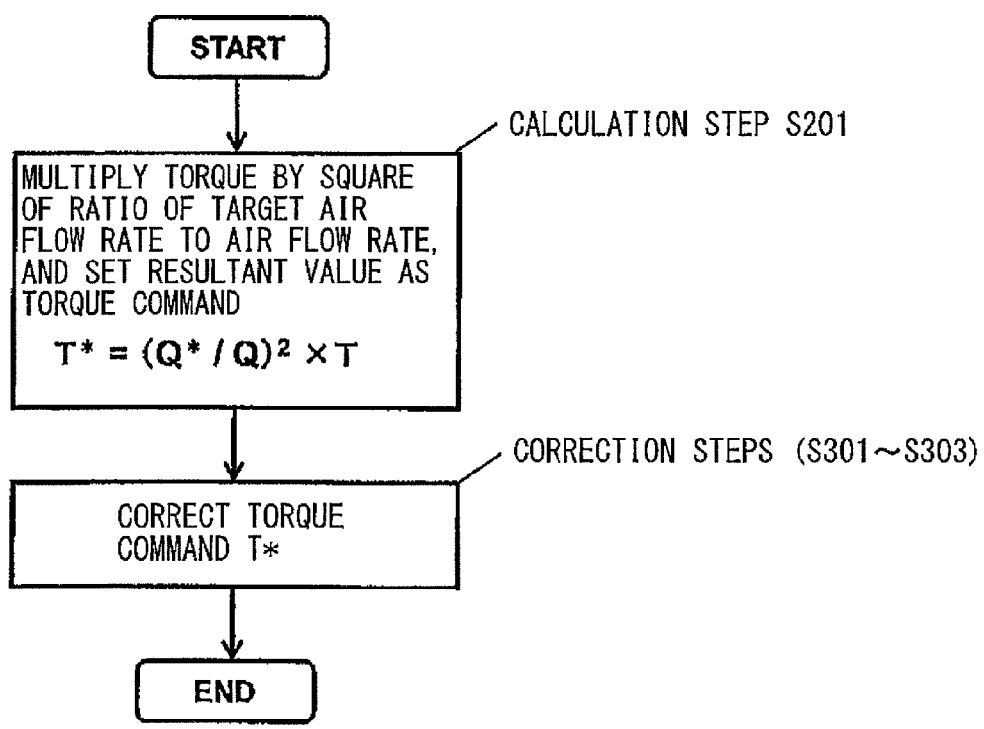
FIG. 2 is a flowchart showing an example of processing by a torque command generator 115 in Embodiment 1 of the present invention.

FIG. 2 is a flowchart showing an example of processing by the torque command generator 115. The torque command T* is generated by a two-stage process. In the initial stage, a calculation step S201 is performed. In the next stage, correction steps (steps S301 to S303) are performed.

In the initial calculation step S201, the torque command T* is calculated by using an equation (8) below.

[Math. 8]

$$T^* = \left(\frac{Q^*}{Q}\right)^2 \cdot T \tag{8}$$

In the equation (8), Q* is a target air flow rate; Q is an air flow rate; and T is a motor torque.

Hereinafter, derivation and grounds for the equation (8) are described. The equation (8) is derived based on similarity of flows as described below.

First, $(\omega/\omega_S)$ is deleted from the equation (5) and equation (6), which are derived from similarity of flows, and thereby an equation (9) below is derived.

[Math. 9]

$$\frac{T}{T_S} = \left(\frac{Q}{Q_S}\right)^2 \tag{9}$$

The equation (9) represents a relationship in which when the air flow rate of the air blower changes from $Q_S$ to Q, the motor torque changes from $T_S$ to T at a rate that is the square of the change rate $(Q/Q_S)$ of the air flow rate. Here, by replacing $T_S$ with the torque command T* and replacing $Q_S$ with the target air flow rate Q* in the equation (9) and modifying the equation (9), the equation (8) is obtained.

Hereinafter, functions and advantages provided by the use of the equation (8) are described. The value of the torque command T* calculated by the equation (8) is a motor torque value at which the target air flow rate Q* is attained. That is, as a result of performing the torque control of the motor with the torque command T* calculated by the equation (8), the air flow rate Q becomes equal to the target air flow rate Q*. Thus, by performing the torque control using the equation (8), the target air flow rate Q* can be obtained promptly.

Figure 3:
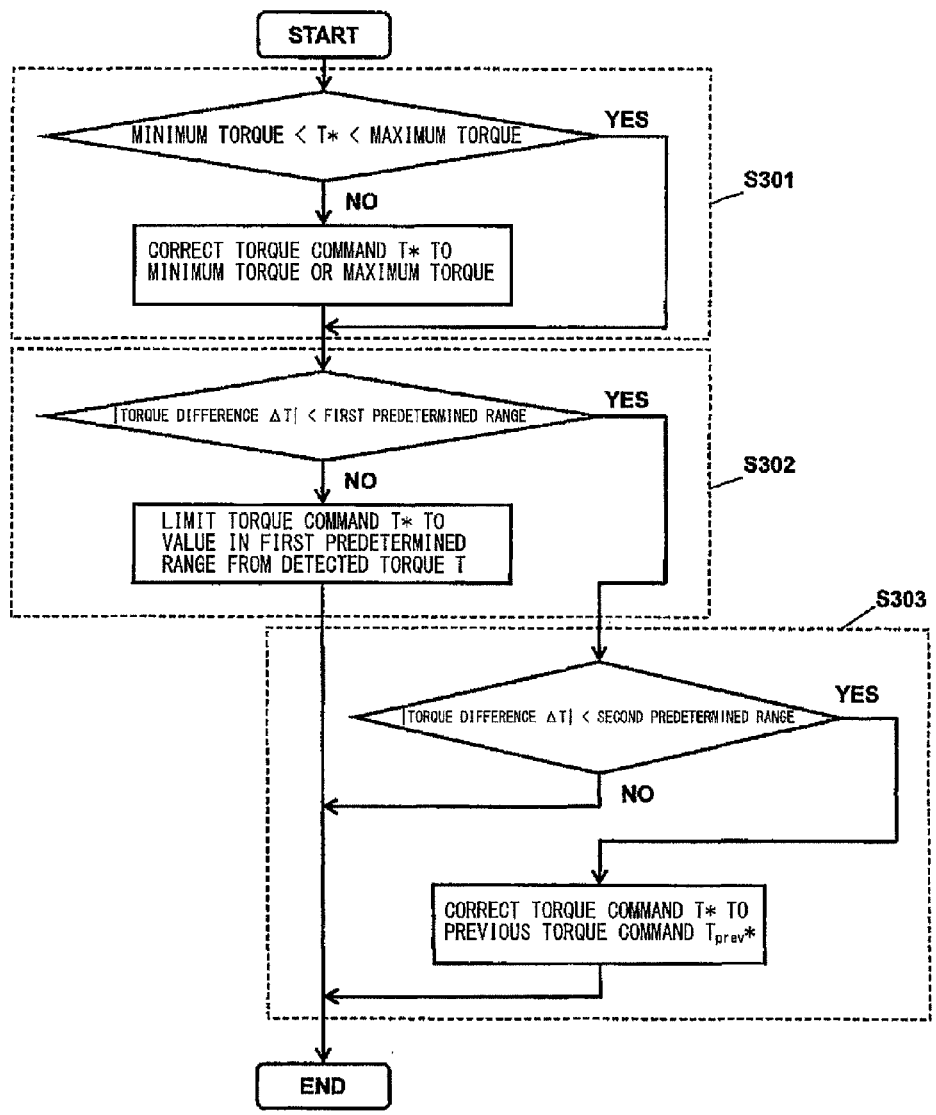
FIG. 3 is a flowchart showing an example of processing in correction steps in FIG. 2.

Next, the correction steps (steps S301 to S303) of FIG. 2 are described. FIG. 3 is a flowchart showing an example of processing in the correction steps in FIG. 2 of the present embodiment.

In step S301, it is determined whether or not the torque command T* calculated in step S201 is in a range from a predetermined minimum torque to a predetermined maximum torque. If the torque command T* is in this range, the torque command T* is not corrected. If the torque command T* is less than the predetermined minimum torque, the torque command T* is corrected to be the predetermined minimum torque. If the torque command T* is greater than the predetermined maximum torque, the torque command T* is corrected to be the predetermined maximum torque.

Advantages obtained from step S301 are described below.

There is a case where the air-conditioning environment does not require much of the motor speed ω in order to obtain the air flow rate value of the target air flow rate Q*, for example, a case where pressure loss in the air supply passage 102 is small. In such an air-conditioning environment, the motor speed ω may become extremely low. In this case, when the air flow rate calculator 113 calculates the air flow rate Q, a small value is assigned to ω in the equation (7). As a result, due to the limit of the operational resolution of the motor control device 110, the air flow rate Q may be calculated as a value that is greater than an actual value. Consequently, for example, an error occurs in the air flow rate to be supplied by the air blower 104, or the speed of the motor 105 decreases and finally stops. In this respect, by setting the predetermined minimum torque, which is the lower limit value of the torque command T*, such error in air flow rate or motor stop can be prevented.

On the other hand, in a case where pressure loss in the air supply passage 102 is great, the torque command T* may become a high value in order to obtain the air flow rate value of the target air flow rate Q*. In this case, the operation that exceeds the capacity of the motor 105 may be attempted, and thereby the operation may become unstable or the motor current may become excessively high. If the motor current becomes excessively high to exceed its rated current value, the motor 105 may break down due to heat generated from the motor winding, or the efficiency may degrade significantly. In a case where the upper limit of the motor torque T is not set, even if the motor 105 has become overloaded as a result of, for example, foreign matter getting caught in the air blower 104, the motor 105 will further increase the torque, which may cause breakdown of the air conditioner 101 including the air blower 104 and the motor 105. In this respect, by setting the predetermined maximum torque, which is the upper limit value of the torque command T*, the control can be prevented from becoming unstable and the air conditioner can be prevented from breaking down.

In the next step S302, first, a torque difference ΔT, which is the difference between the torque command T* and the motor torque T detected by the torque detector 112, is calculated by using an equation (10) below. [Math. 10]

$$\Delta T = T^* - T \quad (10)$$

If the torque difference ΔT is in a first predetermined range, the torque command T* is not corrected, and the torque command T* is used as it is in step S303. On the other hand, if the torque difference ΔT is out of the first predetermined range, the torque command T* is corrected such that the torque difference ΔT becomes within a second predetermined range.

One example of a correction method to be used is as follows. A predetermined absolute value L is set. The absolute value L is added to the motor torque T, and (T+L) is set as an upper limit value. The absolute value L is subtracted from the motor torque T, and (T−L) is set as a lower limit value. If the torque command T* is greater than the upper limit value (T+L), the torque command T* is corrected to be the upper limit value (T+L). If the torque command T* is less than the lower limit value (T−L), the torque command T* is corrected to be the lower limit value (T−L).

Advantages obtained from step S302 are described below. If the motor torque T is changed rapidly, transient changes in the motor torque T and the pressure in the air supply passage 2 may cause a significant divergence between the actual air flow rate and the air flow rate Q calculated by the air flow rate calculator 113. This may cause unstable air flow rate control. In this respect, by setting the first predetermined range as described above to prevent a rapid change in the motor torque T, such unstable control due to the divergence of the air flow rate Q from the actual air flow rate can be prevented.

In the next step S303, if the torque difference ΔT is out of the second predetermined range, the torque command T* is outputted as it is. If the torque difference ΔT is in the second predetermined range, it is determined that the motor torque T has changed just slightly. Then, the torque command T* is corrected to be a value that is the same as a torque command $T^*_{prev}$ previously outputted from the torque command generator 115. Then, the corrected value, i.e., the torque command $T_{prev}^*$, is outputted to the torque controller 115.

Advantages obtained from step S303 are described below. Assume that step S303 is not performed and that the torque command T* is changed even when the motor torque T has changed just slightly. In this case, the torque command T* oscillates in a manner to follow the changes in the motor torque T, and the air flow rate supplied by the air conditioner 101 continuously reaches and deviates from the air flow rate value of the target air flow rate Q* without stably converging. In this respect, by setting a torque detection dead zone by means of the second predetermined range, such oscillation of the torque command T* near the convergence point can be prevented, and the air flow rate can be stably converged to the target air flow rate Q*. It should be noted that the difference between the currently obtained motor torque T and the previously obtained motor torque T may be utilized instead of the difference between the torque command T* and the motor torque T.

The operations of the torque command generator 115 are as described above.

Based on the motor torque T inputted from the torque detector 112 and the torque command T* inputted from the torque command generator 115, the torque controller 116 outputs a drive control signal to the inverter 107 for causing the motor torque T to follow the torque command T*, thereby performing the torque control of the motor 105.

Hereinafter, operations of the motor control device 110 with the above-described configuration are described with reference to FIG. 4 and FIG. 5.

Figure 4:
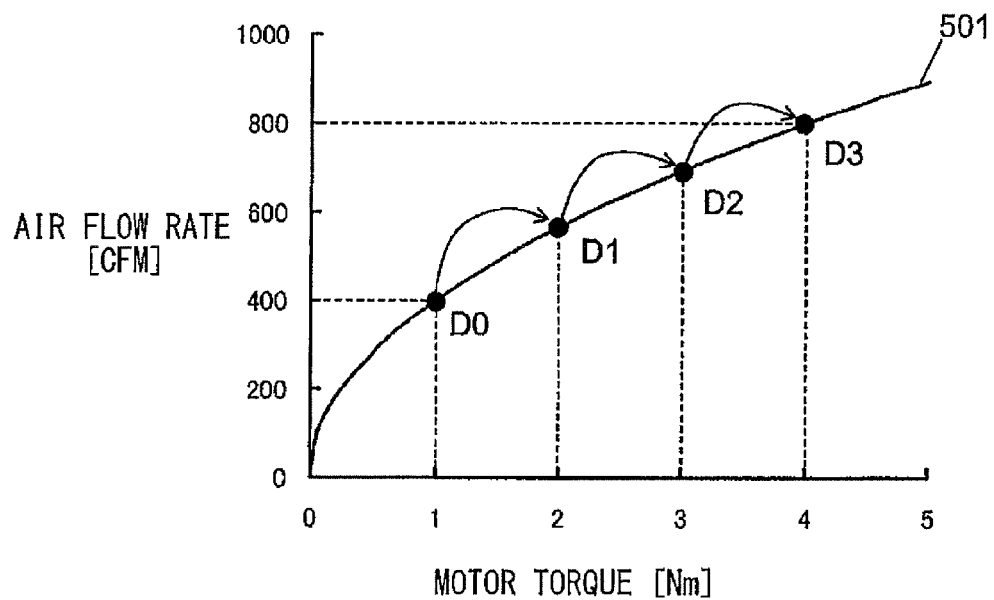
FIG. 4 illustrates torque-air flow rate characteristics in Embodiment 1 of the present invention.

FIG. 4 illustrates torque-air flow rate characteristics in Embodiment 1. In FIG. 4, a curve 501 represents torque-air flow rate characteristics specific to pressure loss conditions in an air-conditioning system including the air supply passage 102. (Hereinafter, the curve 501 is referred to as a "pressure loss curve".) The motor 105 is operable on the pressure loss curve.

Assume here that, in one air-conditioning system, the operating point of the motor 105 is currently a point D0 on the pressure loss curve 501, and that the following settings are made: the target air flow rate Q* is 800 CFM; the predetermined minimum torque is 0.5 Nm; the predetermined maximum torque is 5 Nm; the first predetermined range is an absolute error of 1 Nm; and the second predetermined range is an absolute error of 0.1 Nm. At the point D0, the air flow rate supplied by the air blower 104 is 400 CFM, and the motor torque T is 1 Nm. At the time, the motor control device 110 performs constant air flow rate control in a manner described below.

First, the air flow rate calculator 113 calculates the air flow rate of 400 CFM at the current operating point D0. Next, the torque command generator 114 generates the torque command T* in a manner described below.

In the initial calculation step S201, in the equation (8), the torque command T*=4 [Nm] is calculated by assigning 1 Nm to T, 800 CFM to Q*, and 400 CFM to Q. Accordingly, a point D3 in FIG. 4 becomes a target operating point.

Next, in the correction steps (steps S301 to S303), the torque command T* is corrected. In step S301, it is determined whether or not the torque command T*=4 [Nm] is in a range from the predetermined minimum torque of 0.5 Nm to the predetermined maximum torque of 5 Nm. In this case, since the torque command T*=4 [Nm] is in the range, the torque command T* is used as it is in step S302.

In the next step S302, first, the torque difference ΔT is calculated by using the equation (10). Since the calculated torque difference ΔT=|4−1|=3 [Nm] is greater than the absolute error of 1 Nm, which is the first predetermined range, the torque command T* is corrected to be an upper limit value of 2 Nm, which is a result of adding the predetermined absolute error of 1 Nm to the current motor torque T=1 [Nm]. Accordingly, the target operating point is corrected from the initial point D3 to a point D1 in FIG. 4.

Next, the torque controller 116 receives the torque command T*=2 [Nm] corrected in step S302, and performs torque control of the motor 105, accordingly.

After the operating point has moved to the target point D1 as a result of the torque control, a new torque command T* is generated in the same manner as described above, and the torque control is performed, accordingly. By repeating this process, the operating point is eventually converged to the point D3, at which the target air flow rate of 800 [CFM] is attained, and thus the constant air flow rate control is achieved. At the time, the motor torque T is 4 Nm.

Here, even if the motor torque T has slightly changed from 4 Nm due to pressure change or the like, if the change is less than or equal to 0.1 Nm, then owing to the correction step S303 performed by the torque command generator 115, the torque command T* is prevented from changing, and thereby the operating point is stabilized.

It should be noted that if the pressure loss conditions in the air-conditioning system have changed, the operating point is corrected. FIG. 5 illustrates torque-air flow rate characteristics when the pressure loss conditions change in the present embodiment.

Figure 5:
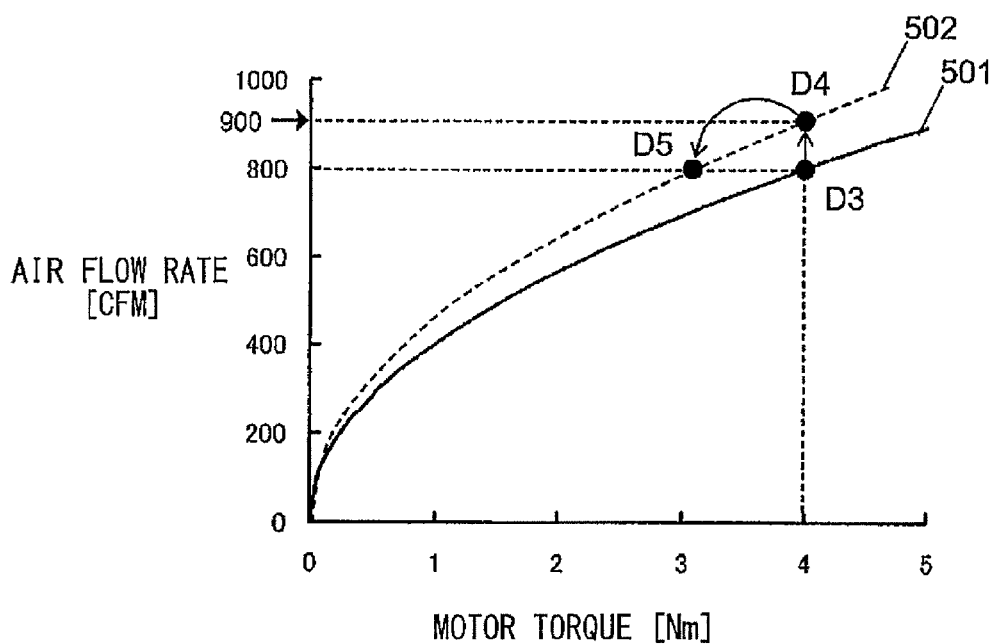
FIG. 5 illustrates torque-air flow rate characteristics when pressure loss conditions change in Embodiment 1 of the present invention.
Figure 6:
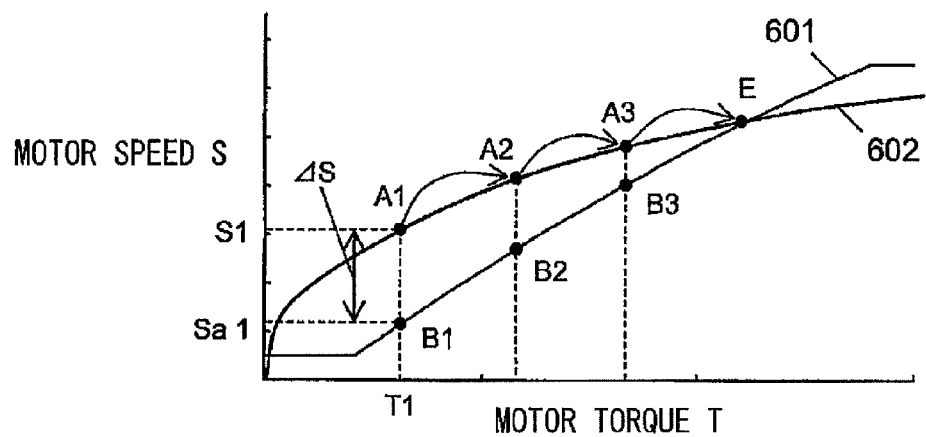
FIG. 6 illustrates conventional constant air flow rate control technique using a motor control device.

Assume that the pressure loss curve changes from 501 to 502 as shown in FIG. 5. In this case, since the torque control of the motor 105 is being performed, the operating point shifts from D3 to D4 with the motor torque T kept to 4 [Nm]. The air flow rate supplied by the air blower 104 at the point D4 is 900 CFM. That is, there is an error of 100 CFM between the air flow rate supplied by the air blower 104 at the point D4 and the target air flow rate of 800 CFM.

Next, the torque command generator 114 performs the calculation step S201 in which: the torque command T* is calculated by assigning 4 Nm to T, 800 CFM to Q*, and 900 CFM to Q in the equation (8). The calculated torque command T* is approximately 3.16 Nm. At the time, since the torque difference ΔT is approximately −0.84 Nm, the torque difference ΔT is in the first predetermined range (i.e., less than or equal to the absolute error of 1 Nm) but out of the second predetermined range (i.e., greater than or equal to the absolute error of 0.1 Nm). Therefore, the torque command T* is outputted to the torque controller 116 as it is without being corrected. Then, the torque control is performed accordingly. As a result, the operating point promptly shifts to a point D5, at which the target air flow rate of 800 CFM is attained, and thus the constant air flow rate control is achieved.

As described above, the motor control device 110 according to the present embodiment includes: the air flow rate calculator 113 configured to calculate the air flow rate Q of the air blower 104 based on the motor speed ω and the motor torque T; and the torque command generator 114 configured to multiply the motor torque T by the square of the ratio of the target air flow rate Q* to the air flow rate Q, and generate the result of the multiplication as the torque command T*.

This configuration makes it possible to cause the air flow rate Q of the air blower to follow the target air flow rate Q* at high speed and stably converge.

Other Embodiments

Next, alternative configurations of Embodiment 1 of the present invention are described.

In Embodiment 1, the air flow rate Q is calculated by using the equation (3). However, as an alternative, a different calculation equation may be utilized. For example, the air flow rate Q, the motor speed ω, and the motor torque T may be measured while changing the pressure loss conditions in the air-conditioning system, and an equation (11) below, to which these measurement data are regressed, may be used.

[Math. 11]

$$Q = \sum_{n=0}^{j}\left[\sum_{m=0}^{i}(K_{nm} \cdot \omega^n \cdot T^m)\right] \quad (11)$$

In the equation (11), Q is an air flow rate; ω is a motor speed; T is a motor torque; i and j are finite values, which are integers greater than or equal to 0; and $k_{nm}$ (n=0, 1, 2, . . . , j and m=0, 1, 2, . . . , i) is a constant.

In the case of using the equation (3) as in Embodiment 1, the blower coefficients $\alpha_n$ and β can be calculated by performing the above-described measurement experiment, in which the motor is driven at a single motor speed, prior to starting the operation controlled by the constant air flow rate control. However, in the case of using the equation (11), the determination of the constant $K_{nm}$ requires the air flow rate Q, the motor speed ω, and the motor torque T to be measured while the motor speed is being changed. Therefore, the use of the equation (11) requires more man-hours in the experiment than in the case of using the equation (3). However, the air flow rate Q can be calculated also by using the equation (11).

Since the torque control of the motor 105 is performed, the torque command T* and the motor torque T are substantially equal except during a steep transient period. For this reason, instead of using the equation (8) as in Embodiment 1, an equation (12) below may be used as the calculation equation for calculating the torque command T*.

[Math. 12]

$$T^* = \left(\frac{Q^*}{Q}\right)^2 \cdot T^*_{prev} \qquad (12)$$

In the equation (12), $T^*$ is a torque command; $T^*_{prev}$ is a torque command previously outputted from the torque command generator 115; $Q^*$ is a target air flow rate; and $Q$ is an air flow rate.

INDUSTRIAL APPLICABILITY

The motor control device according to the present invention is optimally applied to a system that controls an air flow rate to be a predetermined air flow rate value. Specifically, the motor control device according to the present invention is useful in air-conditioning equipment of a house for general household, a professional-use building, a commercial-use building, a vehicle, etc.

What is claimed is:

1. A motor control device for controlling a motor driving an air blower, the motor control device comprising:
   an air flow rate calculator configured to obtain a motor speed and a motor torque of the motor, and calculate an air flow rate of the air blower based on the motor speed and the motor torque; and
   a torque command generator configured to multiply the motor torque by a square of a ratio of a target air flow rate to the air flow rate or multiply a previously outputted torque command by the square of the ratio of the target air flow rate to the air flow rate, and generate a torque command by utilizing a result of the multiplication.

2. The motor control device according to claim 1, further comprising a torque controller configured to generate a signal that controls a drive voltage to the motor such that the motor torque becomes coincident with the torque command.

3. The motor control device according to claim 1, comprising a storage unit configured to store a minimum torque and a maximum torque, wherein the torque command generator limits the torque command to be in a range from the minimum torque to the maximum torque.

4. The motor control device according to claim 1, wherein if a difference between the torque command and the motor torque is out of a first predetermined range, the torque command generator corrects the torque command such that the difference between the torque command and the motor torque becomes within the first predetermined range.

5. The motor control device according to claim 1, wherein in at least one of a case where a difference between the torque command and the motor torque is in a second predetermined range and a case where a difference between the currently obtained motor torque and a previously obtained motor torque is in the second predetermined range, the torque command generator outputs the torque command whose value is the same as that of the previously outputted torque command.

6. The motor control device according to claim 1, wherein the air flow rate calculator obtains the motor speed by receiving a first detection signal indicative of the motor speed, which is inputted from a first detector configured to detect the motor speed.

7. The motor control device according to claim 1 wherein the air flow rate calculator obtains the motor torque by receiving the motor torque or a current flowing through the motor, each of which is inputted from a second detector configured to detect the motor torque or the current flowing through the motor.

8. A motor control method of controlling a motor driving an air blower, the method comprising:
   obtaining a motor speed and a motor torque of the motor;
   calculating an air flow rate of the air blower based on the obtained motor speed and motor torque; and
   multiplying the motor torque by a square of a ratio of a target air flow rate to the air flow rate or multiplying a previously outputted torque command by the square of the ratio of the target air flow rate to the air flow rate, and generating a torque command by utilizing a result of the multiplication.

* * * * *